United States Patent
Ferrarons Llagostera et al.

(10) Patent No.: US 10,402,751 B2
(45) Date of Patent: Sep. 3, 2019

(54) DOCUMENT ANALYSIS SYSTEM THAT USES MACHINE LEARNING TO PREDICT SUBJECT MATTER EVOLUTION OF DOCUMENT CONTENT

(71) Applicant: CA, Inc., New York, NY (US)

(72) Inventors: Jaume Ferrarons Llagostera, Barcelona (ES); David Sánchez Charles, Barcelona (ES); Victor Muntés Mulero, Barcelona (ES)

(73) Assignee: CA, Inc., New York, NY (US)

( * ) Notice: Subject to any disclaimer, the term of this patent is extended or adjusted under 35 U.S.C. 154(b) by 836 days.

(21) Appl. No.: 15/076,007

(22) Filed: Mar. 21, 2016

(65) Prior Publication Data

US 2017/0270430 A1     Sep. 21, 2017

(51) Int. Cl.
*G06N 20/00* (2019.01)

(52) U.S. Cl.
CPC .................................... *G06N 20/00* (2019.01)

(58) Field of Classification Search
USPC .......................................................... 706/12
See application file for complete search history.

(56) References Cited

U.S. PATENT DOCUMENTS

| | | | |
|---|---|---|---|
| 6,804,670 | B2 | 10/2004 | Kreulen et al. |
| 7,961,943 | B1 * | 6/2011 | Zeevi ................. G06F 3/04883 382/173 |
| 2009/0063387 | A1 | 3/2009 | Beaty et al. |
| 2009/0177690 | A1 | 7/2009 | Guven et al. |
| 2018/0054472 | A1 * | 2/2018 | Greenspan ............. H04L 67/10 |
| 2018/0107581 | A1 * | 4/2018 | Aggarwal ............... G06F 9/454 |
| 2018/0152506 | A1 * | 5/2018 | Simo ................... G06Q 10/0631 |
| 2018/0173687 | A1 * | 6/2018 | Noguero ............. G06F 16/9024 |
| 2018/0173789 | A1 * | 6/2018 | Llagostera ............ G06N 7/005 |
| 2018/0174062 | A1 * | 6/2018 | Simo ....................... G06N 3/04 |
| 2018/0174072 | A1 * | 6/2018 | Charles .................... G06N 5/02 |
| 2018/0176108 | A1 * | 6/2018 | Llagostera ............. H04L 43/08 |
| 2018/0285181 | A1 * | 10/2018 | Zasadzinski ......... G06F 11/079 |
| 2018/0285904 | A1 * | 10/2018 | Simo .................. G06Q 30/0203 |

\* cited by examiner

*Primary Examiner* — Michael B Holmes
(74) *Attorney, Agent, or Firm* — Sage Patent Group

(57) ABSTRACT

A method includes performing, by a processor: receiving a document containing subject matter related to a course of action, the document comprising a plurality of sub-documents that are related to one another in a time sequence, converting the document to a vector format to generate a vectorized document that encodes a probability distribution of words in the document and transition probabilities between words, applying a machine learning algorithm to the vectorized document to generate an estimated vectorized document, associating the estimated vectorized document with a reference document; predicting future subject matter contained in a future sub-document of the document based on the reference document, and adjusting the course of action responsive to predicting the future subject matter.

20 Claims, 5 Drawing Sheets

DOCUMENT ANALYSIS SYSTEM THAT USES MACHINE LEARNING TO PREDICT SUBJECT MATTER EVOLUTION OF DOCUMENT CONTENT

BACKGROUND

The present disclosure relates to computer systems, and, in particular, to methods, systems, and computer program products for predicting the future content of an information exchange having subject matter that changes over time.

Some textual documents, such as tickets in customer support systems, evolve over time. A document, such as a help request ticket, may comprise a sequence of messages exchanged between a customer and one or more support engineers. The complete sequence of these messages contains all of the information about the ticket, but they are typically generated sequentially over a period of time, which may range from a day to several months depending on the complexity of the issue to be solved. The first messages usually provide a general description of the problem. The content of the messages may, however, evolve throughout the chain of messages and delve into other topics of discussion related to the initial issue, concepts that may be relevant to addressing the issue, etc. Thus, a document, such as a trouble ticket may be routed to a particular subject matter expert based on the initial messages from a customer. But as more messages are exchanged, it may become clear that the original assignment of the document to a particular subject matter expert for resolution of a problem was in error because the classification of the subject matter describing the problem was incorrect.

SUMMARY

In some embodiments of the inventive subject matter, a method comprises performing, performing by a processor: receiving a document containing subject matter related to a course of action, the document comprising a plurality of sub-documents that are related to one another in a time sequence, converting the document to a vector format to generate a vectorized document that encodes a probability distribution of words in the document and transition probabilities between words, applying a machine learning algorithm to the vectorized document to generate an estimated vectorized document, associating the estimated vectorized document with a reference document; predicting future subject matter contained in a future sub-document of the document based on the reference document, and adjusting the course of action responsive to predicting the future subject matter.

In other embodiments of the inventive subject matter, a system comprises a processor and a memory coupled to the processor and comprising computer readable program code embodied in the memory that is executable by the processor to perform: receiving a document containing subject matter related to a course of action, the document comprising a plurality of sub-documents that are related to one another in a time sequence, converting the document to a vector format to generate a vectorized document that encodes a probability distribution of words in the document and transition probabilities between words, applying a machine learning algorithm to the vectorized document to generate an estimated vectorized document, associating the estimated vectorized document with a reference document, predicting future subject matter contained in a future sub-document of the document based on the reference document, adjusting the course of action by determining a destination for communication of the document based on the future subject matter that was predicted, and electronically communicating the document to the destination.

In further embodiments of the inventive subject matter, a computer program product comprises a tangible computer readable storage medium comprising computer readable program code embodied in the medium that is executable by a processor to perform: receiving a document containing subject matter related to a course of action, the document comprising a plurality of sub-documents that are related to one another in a time sequence, converting the document to a vector format to generate a vectorized document that encodes a probability distribution of words in the document and transition probabilities between words, applying a machine learning algorithm to the vectorized document to generate an estimated vectorized document, associating the estimated vectorized document with a reference document, predicting future subject matter contained in a future sub-document of the document based on the reference document, and adjusting the course of action by allocating computing resources based on the future subject matter that was predicted.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
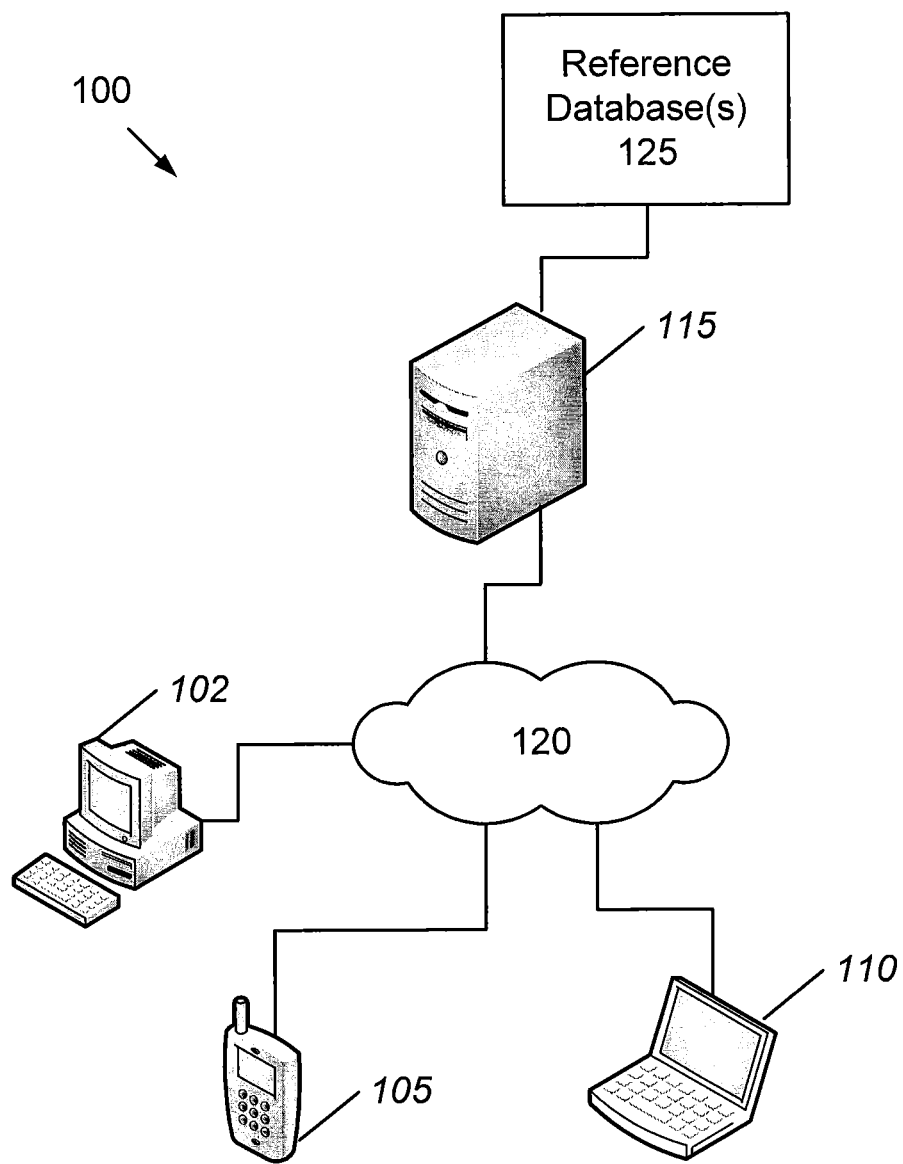
FIG. 1 is a block diagram that illustrates a communication network including a document analysis server for predicting the subject matter evolution of document content in accordance with some embodiments of the inventive subject matter.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

Some embodiments of the inventive subject matter stem from a realization that in an information exchange between two entities an estimate of the words and/or topics of a complete sequence of n messages forming, for example, a document can be generated based on the first k messages, where k is less than or equal to n using machine learning techniques. Thus, an entire conversation or information exchange between two entities, for example, can be predicted based on information extracted from a first portion of the conversation. A course of action regarding the subject matter of the document may be adjusted based on the prediction. For example, if the document comprises a sequence of sub-documents corresponding to an exchange between a customer and a technical specialist, a prediction may be generated that indicates a likely resolution to the customer's problem or that the document needs to be forwarded to a particular subject matter expert for further attention and analysis. This may allow the enterprise serving the customer to be more efficient in responding to inquiries and problems thereby improving customer satisfaction.

Referring to FIG. 1, a communication network including a document analysis server for predicting the subject matter evolution of document content, in accordance with some embodiments of the inventive subject matter, comprises end user devices 102, 105, and 110 that are coupled to a document analysis server 115 via a network 120. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks. The end user devices 102, 105, 110 may represent wired and/or wireless devices that include one or more applications that allow an end user to access the document analysis server 115 to predict the subject matter evolution of one or more documents in accordance with some embodiments of the inventive subject matter. Moreover, end user devices or terminals may be connected directly to the document analysis server 115 without going through the network 120 in other embodiments of the inventive subject matter. It will be appreciated that in accordance with various embodiments of the inventive subject matter, the document analysis server 115 may be implemented as a single server, separate servers, or a network of servers either co-located in a server farm, for example, or located in different geographic regions.

The document analysis server 115 may be connected to one or more information repositories represented as reference database(s) 125. The reference database(s) 125 may include other documents and information that can be used to facilitate the prediction of the future subject matter content of a document that evolves over time.

As shown in FIG. 1, some embodiments according to the inventive subject matter can operate in a logically separated client side/server side-computing environment, sometimes referred to hereinafter as a client/server environment. The client/server environment is a computational architecture that involves a client process (i.e., client devices 102, 105 and 110) requesting service from a server process (i.e., document analysis server 115). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP), SOAP, XML-RPC, and/or WSDL. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although FIG. 1 illustrates an exemplary communication network including a document analysis server for predicting subject matter evolution of document content, it will be understood that embodiments of the inventive subject matter are not limited to such configurations, but are intended to encompass any configuration capable of carrying out the operations described herein.

Figure 2:
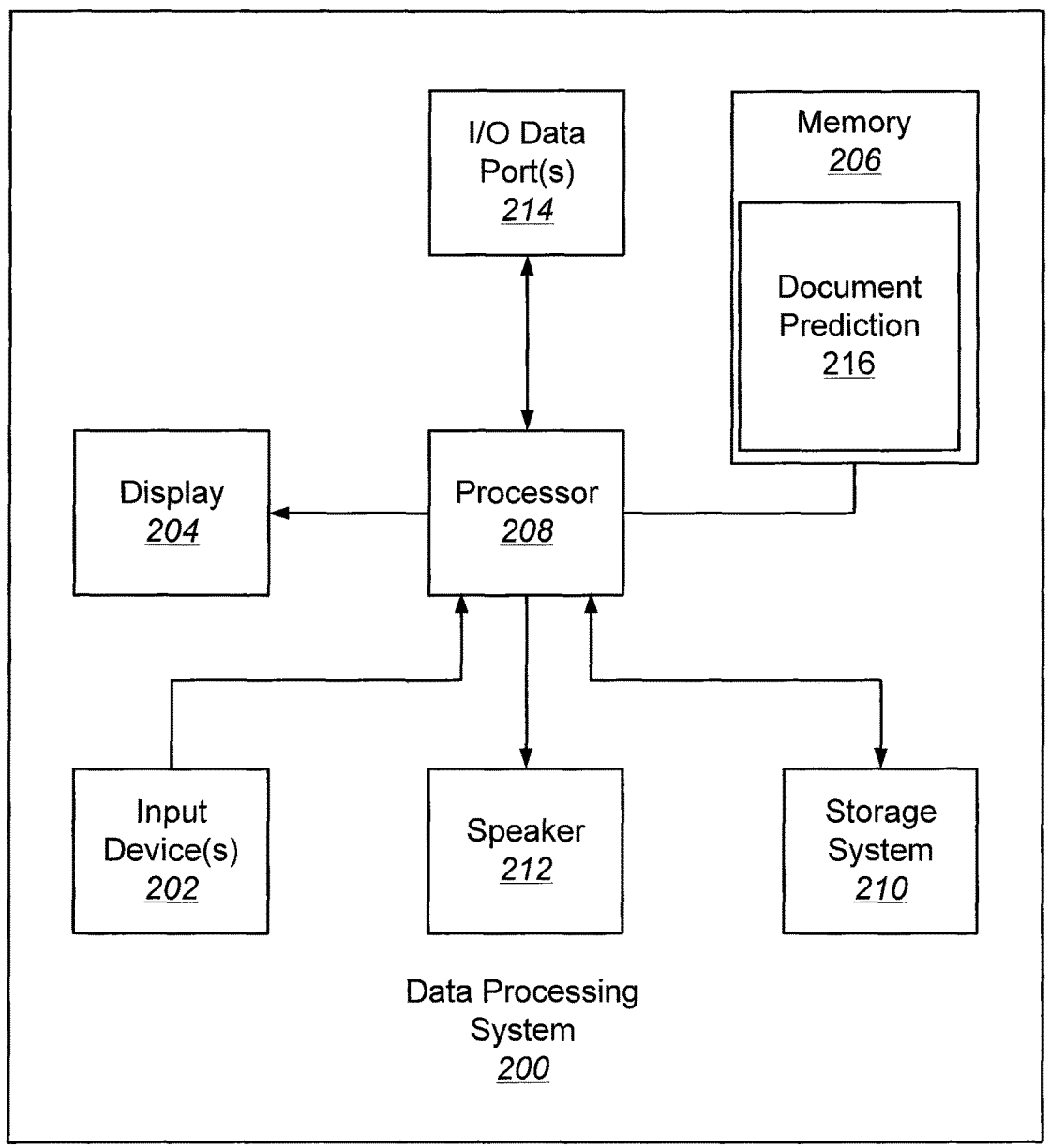
FIG. 2 illustrates a data processing system that may be used to implement the document analysis server of FIG. 1 in accordance with some embodiments of the inventive subject matter.

Referring now to FIG. 2, a data processing system 200 that may be used to implement the document analysis server 115 of FIG. 1, in accordance with some embodiments of the inventive subject matter, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a document prediction module 216 that may provide functionality that may include, but is not limited to, facilitating the prediction of subject matter evolution of document content.

Figure 3:
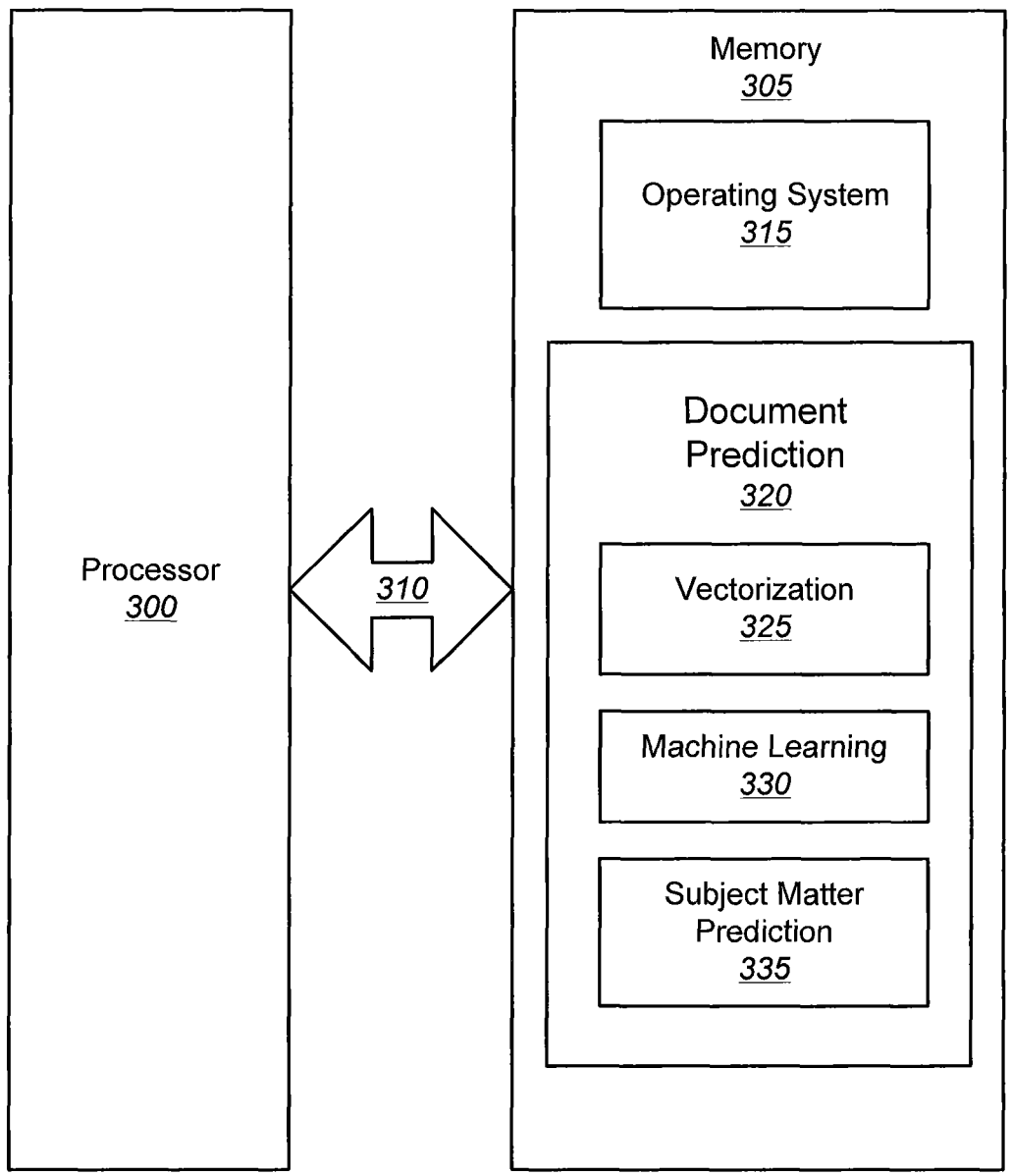
FIG. 3 is a block diagram that illustrates a software/hardware architecture for use in an a document analysis server for predicting the subject matter evolution of document content in accordance with some embodiments of the inventive subject matter.

FIG. 3 illustrates a processor 300 and memory 305 that may be used in embodiments of data processing systems, such as the document analysis server 115 of FIG. 1 and the data processing system 200 of FIG. 2, respectively, for facilitating the prediction of subject matter evolution of document content in accordance with some embodiments of the inventive subject matter. The processor 300 communicates with the memory 305 via an address/data bus 310. The processor 300 may, be, for example, a commercially available or custom microprocessor. The memory 305 is representative of the one or more memory devices containing the software and data used for predicting subject matter evolution of document content in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain two or more categories of software and/or data: an operating system 315 and a document prediction module 320. In particular, the operating system 315 may manage the data processing system's software and/or hardware resources and may coordinate execution of programs by the processor 300. The document prediction module 320 may comprise a vectorization module 325, a machine learning module 330, and a subject matter prediction module 335.

The vectorization module 325 may be configured to receive a document that comprises a plurality of sub-documents that are related to one another in a time sequence. Examples of such documents may include, but are not limited to, trouble tickets exchanged between a customer and a technical specialist, messages exchanged between a patient and a medical professional, blog entries or comments on a Web page, and the like. The vectorization module 325 may be further configured to convert the documents to a vector format to generate a vectorized document. In accordance with various embodiments of the inventive subject matter, the vectorization module 325 may use vectorization algorithms, such as Doc2Vec, Latent Dirichlet Allocation (LDA), and/or Term Frequency-Inverse Document Frequency (TF-IDF) to generate the vectorized document. These vectorization algorithms may encode the probability distribution of words in the document along with the transition probabilities between words.

The machine learning module 330 may be configured to apply a machine learning algorithm to the vectorized document to generate an estimated vectorized document. In accordance with embodiments of the inventive subject matter, various machine learning algorithms may be used including, but not limited to, a neural network machine learning model, a linear regression machine learning model, and an ensemble machine learning model. The ensemble methodology may be used when models generated by machine learning algorithms are independent of each other. The ensemble machine learning model may comprise a plurality of Bayes optimal classifier, bagging, boosting, Bayesian parameter averaging, Bayesian model combination, bucket of models, and stacking.

The subject matter prediction module 335 may be configured to associate the estimated vectorized document output from the machine learning module 330 with a reference document, such as a document stored in the reference database(s) 125 of FIG. 1. For example, in the case of a technical specialist processing a document comprising multiple trouble tickets, the subject matter prediction module 335 may associate the estimated vectorized document with one or more documents containing trouble tickets corresponding to problems that were previously resolved. Thus, the subject matter prediction module 335 may generate a prediction of the subject matter that is likely to be included in a future sub-document of the document as the document evolves over time, e.g., in the case of a customer help desk scenario the sub-documents may be trouble tickets and responses exchanged by a customer and a technical specialist over time. In some embodiments, the documents in the reference database(s) 125 may also be vectorized to allow the subject matter prediction module 335 to perform a Euclidean Distance analysis and/or a Cosine Similarity analysis between the estimated vectorized document and one or more reference documents. Based on the prediction of the future subject matter, subject matter prediction module 335 may trigger an adjustment in a course of action. For example, the document may be electronically communicated to a particular destination based on the prediction of the future subject matter. This destination may correspond, for example, to a particular organization, subject matter expert, supervisor, etc. In other embodiments, computing resources may be allocated based on the predicted future subject matter. For example, based on a sequence of messages that are exchanged between engineers examining a computing system, the subject matter prediction module 335 may predict the future subject matter is related to one or more computer system problems in which the resolution required additional memory, higher speed processing capability, more network bandwidth, or the like.

Although FIG. 3 illustrates hardware/software architectures that may be used in data processing systems, such as the document analysis server 115 of FIG. 1 and the data processing system 200 of FIG. 2, respectively, for facilitating the prediction of the subject matter evolution of document content in accordance with some embodiments of the inventive subject matter, it will be understood that the present invention is not limited to such a configuration but is intended to encompass any configuration capable of carrying out operations described herein.

Computer program code for carrying out operations of data processing systems discussed above with respect to FIGS. 1-3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the document analysis server 115 of FIG. 1, the data processing system 200 of FIG. 2, and the hardware/software architecture of FIG. 3, may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus of FIGS. 1-3 may be used to facilitate the prediction of the subject matter evolution of document content according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 206 coupled to the processor 208 and the memory 305 coupled to the processor 300 include computer readable program code that, when executed by the respective processors, causes the respective processors to perform operations including one or more of the operations described herein with respect to FIGS. 4-6.

Figure 4:
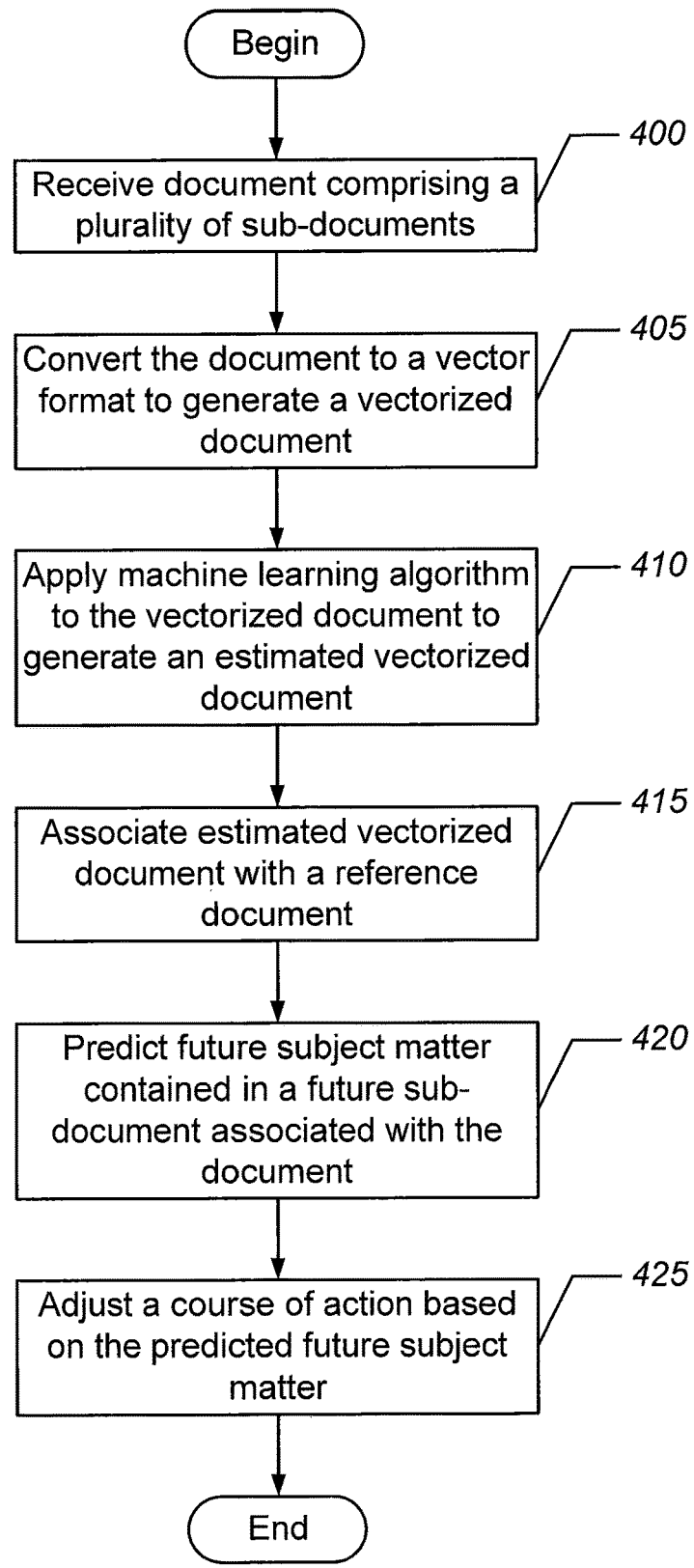
FIG. 4 is a flowchart diagram that illustrates operations for predicting the subject matter evolution of document content in accordance with some embodiments of the inventive subject matter.
Figure 5:
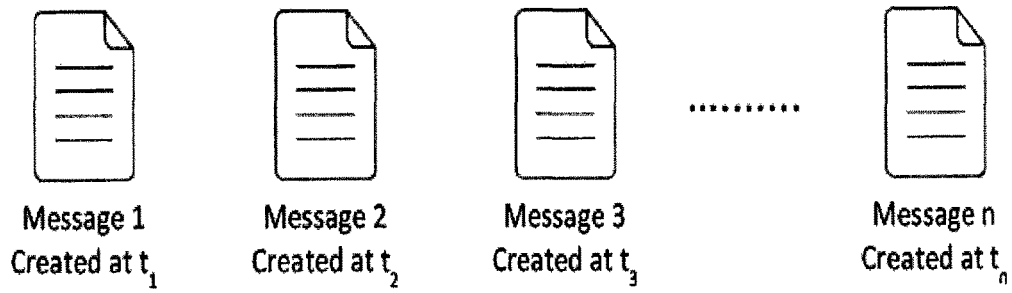
FIGS. 5 and 6 are block diagrams that illustrate document vectorization, machine learning, and document subject matter prediction operations in accordance with some embodiments of the inventive subject matter.
Figure 6:
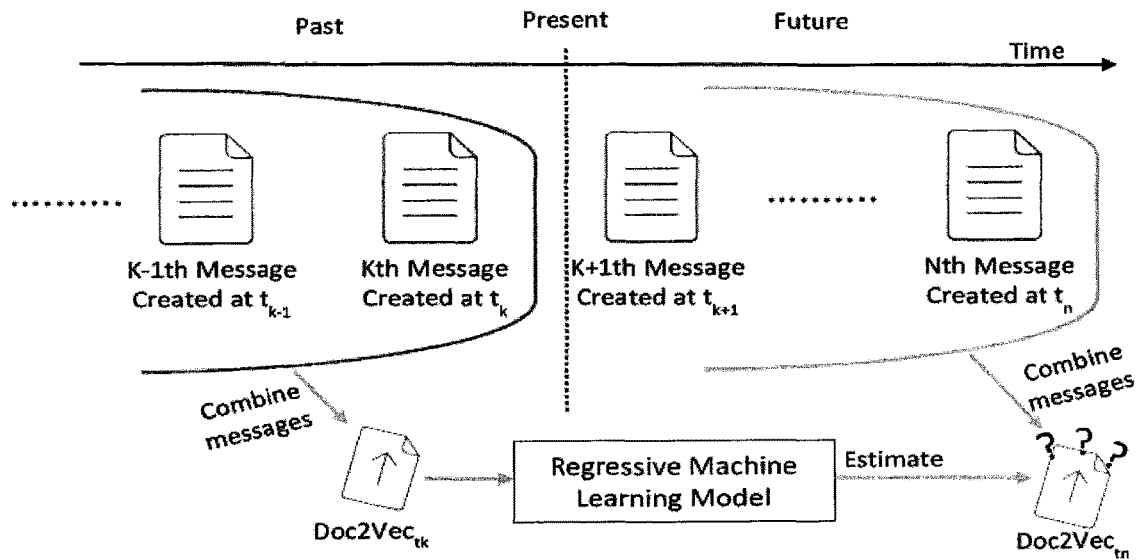

FIG. 4 is a flowchart that illustrates operations for predicting the subject matter evolution of document content in accordance with some embodiments of the inventive subject matter. Operations begin at block 400 where the vectorization module 325 receives a document comprising a plurality of sub-documents. This is illustrated, for example, in FIG. 5 here a document comprising a plurality of messages—Message 1, Message 2, . . . Message n—is received in a time sequence represented by $t_1, t_2, \ldots t_n$. The sequence of messages in FIG. 5 may represent a message sequence up to a present time and extending into the future. For example, Message 1 at $t_1$ through Message k at $t_k$ may be a plurality of sub-documents comprising the document at a present time and Message k+1 at time $t_{k+1}$ through Message n at time $t_n$ may represent future sub-documents in time. At block 405, the vectorization module 325 converts the document to a vector format to generate a vectorized document. The vectorization process is illustrated in FIG. 6 for the example of FIG. 5 where the document at the present time comprises sub-documents Message 1 through Message k. The Doc2Vec vectorization algorithm is used to generate the vectorized document, which encodes the probability distribution of words in the document along with the transition probabilities between words. Other vectorization algorithms, such as, but not limited to, LDA and TF-IDF may be used in various other embodiments of the inventive subject matter.

The machine learning module 330 applies a machine learning algorithm to the vectorized document to generate an estimated vectorized document at block 410. As shown in the example of FIG. 6, the machine learning module 330 uses linear regression machine learning model to generate the estimated vectorized document. Other machine learning algorithms, such as, but not limited to, a neural network machine learning model and an ensemble machine learning model may be used in various other embodiments of the inventive subject matter. The ensemble machine learning model may comprise a plurality of Bayes optimal classifier, bagging, boosting, Bayesian parameter averaging, Bayesian model combination, bucket of models, and stacking.

At block 415, the subject matter prediction module 335 may associate the estimated vectorized document output from the machine learning module 330 with a reference document, such as a document stored in the reference database(s) 125 of FIG. 1. Moreover, the subject matter prediction module 335 may generate a prediction of the subject matter that is likely to be included in one or more future sub-documents of the document as the document evolves over time, i.e., the content of Message k+1 through Message n at block 420. In some embodiments, the documents in the reference database(s) 125 may also be vectorized to allow the subject matter prediction module 335 to perform a Euclidean Distance analysis and/or a Cosine Similarity analysis between the estimated vectorized document and one or more reference documents. Based on the prediction of the subject matter in one or more future sub-documents of the document, the subject matter prediction module 335 may trigger an adjustment in a course of action at block 425. For example, in some embodiments, based on the predicted future subject matter of the one or more future sub-documents, the subject matter prediction module 335 may determine a destination location for electronically communicating the document. This destination may correspond to an entity or person who may be best equipped to address issues raised in the document or who may have interest in the subject matter of the document. In some embodiments, adjusting the course of action may involve allocating computing resources based on the predicted future subject matter. For example, the document subject matter may pertain to an architectural discussion for a computing system, trouble tickets generated due to hardware or software bugs, or the like. The subject matter prediction module 335 may predict that future sub-documents associated with such a document result in a change in computing resources, such as processors, memory, network equipment, and the like. Thus, computing resources may be allocated according to the predicted subject matter of future sub-documents.

Embodiments of the inventive subject matter may be used in a variety of applications. For example, a document comprising a sequence of trouble tickets between a technical specialist and a customer may be forwarded to a subject matter expert based on an analysis of the initial trouble tickets and a prediction of the subject matter associated with future trouble tickets. In other embodiments, documents can be retrieved and provided to a technical specialist in advance anticipating that future trouble ticket messages may be directed to the subject matter contained in these documents.

In a health care setting, a triage medical professional may record various symptoms of a patient along with the patient's vitals. These data may be considered sub-documents that are part of an overall document addressing a patient's health condition. Based on these initial data, a prediction can be generated that the patient will complain of one or more additional symptoms and/or may be diagnosed in a particular manner. Thus, the document may be electronically communicated to a particular specialist and/or department in the health care facility for additional analysis or treatment.

In a computer system development and/or support setting, embodiments of the inventive subject matter may complement bug tracking tools to assist in their classification and/or resolution. For example, based on a discussion among software developers describing a particular bug in the system, a prediction may be generated that this type of bug is typically classified as moderate in severity and generally takes 2-3 days to resolve. In some embodiments, predictions can be made regarding typically sources of the bug or techniques to try to further pinpoint the cause of the bug.

In a customer service setting, embodiments of the inventive subject matter may be used to monitor the exchange of messages between a customer and a customer support representative. A prediction may be generated regarding the satisfaction of the customer's experience in the exchange. If the prediction indicates that the customer is likely to be dissatisfied or frustrated, the document containing the exchange can be electronically communicated to a supervisor allowing the supervisor to intervene to address the customer's concerns.

In a sales setting, embodiments of the inventive subject matter may be used to monitor the exchange of messages between a customer and a sales representative. A prediction may be generated regarding the likelihood that the customer may make a purchase based on the exchange of messages thus far. If it appears that a sale is unlikely, then the sales representative may change the terms of the offer and/or offer a different product or service for which the customer may be more receptive.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    performing by a processor:
    receiving a document containing subject matter related to a course of action, the document comprising a plurality of sub-documents that are related to one another in a time sequence;
    converting the document to a vector format to generate a vectorized document that encodes a probability distribution of words in the document and transition probabilities between words;
    applying a machine learning algorithm to the vectorized document to generate an estimated vectorized document;
    associating the estimated vectorized document with a reference document;
    predicting future subject matter contained in a future sub-document of the document based on the reference document; and
    adjusting the course of action responsive to predicting the future subject matter.

2. The method of claim 1, wherein converting the document to the vector format comprises:
    applying a Doc2Vec algorithm to the document to generate the vectorized document.

3. The method of claim 1, wherein converting the document to the vector format comprises:
    applying a Latent Dirichlet Allocation (LDA) algorithm to the document to generate the vectorized document.

4. The method of claim 1, wherein converting the document to the vector format comprises:
    applying a Term Frequency-Inverse Document Frequency (TF-IDF) algorithm to the document to generate the vectorized document.

5. The method of claim 1, wherein the machine learning algorithm is a neural network machine learning model.

6. The method of claim 1, wherein the machine learning algorithm is a linear regression machine learning model.

7. The method of claim 1, wherein the machine learning algorithm comprises an ensemble machine learning model.

8. The method of claim 7, wherein the ensemble machine learning model comprises a plurality of Bayes optimal classifier, bagging, boosting, Bayesian parameter averaging, Bayesian model combination, bucket of models, and stacking.

9. The method of claim 1, wherein associating the estimated vectorized document with a reference document comprises:
    performing a Euclidean Distance analysis between the estimated vectorized document and the reference document.

10. The method of claim 1, wherein associating the estimated vectorized document with a reference document comprises:
    performing a Cosine Similarity analysis between the estimated vectorized document and the reference document.

11. The method of claim 1, wherein adjusting the course of action responsive to predicting the future subject matter comprises:

determining a destination for communication of the document based on the future subject matter that was predicted; and electronically communicating the document to the destination.

12. The method of claim 1, wherein adjusting the course of action responsive to predicting the future subject matter comprises:

allocating computing resources based on the future subject matter that was predicted.

13. A system comprising:

a processor; and a memory coupled to the processor and comprising computer readable program code embodied in the memory that is executable by the processor to perform:

receiving a document containing subject matter related to a course of action, the document comprising a plurality of sub-documents that are related to one another in a time sequence;

converting the document to a vector format to generate a vectorized document that encodes a probability distribution of words in the document and transition probabilities between words;

applying a machine learning algorithm to the vectorized document to generate an estimated vectorized document;

associating the estimated vectorized document with a reference document;

predicting future subject matter contained in a future sub-document of the document based on the reference document;

adjusting the course of action by determining a destination for communication of the document based on the future subject matter that was predicted; and electronically communicating the document to the destination.

14. The system of claim 13, wherein converting the document to the vector format comprises:

applying one of a Doc2Vec algorithm, a Latent Dirichlet Allocation (LDA) algorithm, and a Term Frequency-Inverse Document Frequency (TF-IDF) algorithm to the document to generate the vectorized document.

15. The system of claim 13, wherein the machine learning algorithm is one of a neural network machine learning model, a linear regression machine learning model, and an ensemble machine learning model.

16. The system of claim 13, wherein associating the estimated vectorized document with a reference document comprises:

performing one of a Euclidean Distance analysis and a Cosine Similarity analysis between the estimated vectorized document and the reference document.

17. A computer program product comprising:

a tangible computer readable storage medium comprising computer readable program code embodied in the medium that is executable by a processor to perform:

receiving a document containing subject matter related to a course of action, the document comprising a plurality of sub-documents that are related to one another in a time sequence;

converting the document to a vector format to generate a vectorized document that encodes a probability distribution of words in the document and transition probabilities between words;

applying a machine learning algorithm to the vectorized document to generate an estimated vectorized document;

associating the estimated vectorized document with a reference document;

predicting future subject matter contained in a future sub-document of the document based on the reference document; and adjusting the course of action by allocating computing resources based on the future subject matter that was predicted.

18. The computer program product of claim 13, wherein converting the document to the vector format comprises:

applying one of a Doc2Vec algorithm, a Latent Dirichlet Allocation (LDA) algorithm, and a Term Frequency-Inverse Document Frequency (TF-IDF) algorithm to the document to generate the vectorized document.

19. The computer program product of claim 13, wherein the machine learning algorithm is one of a neural network machine learning model, a linear regression machine learning model, and an ensemble machine learning model.

20. The computer program product of claim 13, wherein associating the estimated vectorized document with a reference document comprises:

performing one of a Euclidean Distance analysis and a Cosine Similarity analysis between the estimated vectorized document and the reference document.

* * * * *